United States Patent [19]

Kamiya

[11] Patent Number: 4,634,174
[45] Date of Patent: Jan. 6, 1987

[54] VEHICLE BODY HAVING REAR PARCEL SHELF

[75] Inventor: Yoshinori Kamiya, Sagamihara, Japan

[73] Assignee: Nissan Motor Co., Ltd., Japan

[21] Appl. No.: 751,684

[22] Filed: Jul. 3, 1985

[30] Foreign Application Priority Data

Jul. 4, 1984 [JP] Japan .................. 59-137266

[51] Int. Cl.$^4$ ............................................. B62D 25/08
[52] U.S. Cl. .................................................. 296/195
[58] Field of Search ............... 296/195, 193, 187, 185

[56] References Cited

U.S. PATENT DOCUMENTS

| | | | |
|---|---|---|---|
| 3,661,419 | 5/1972 | Mitamara | 296/195 |
| 4,351,559 | 9/1982 | Sugisawa | 296/195 |
| 4,408,794 | 10/1983 | Harasaki | 296/195 |
| 4,516,803 | 5/1985 | Kaltz et al. | 296/195 |

FOREIGN PATENT DOCUMENTS 221772 12/1983 Japan ................................. 296/195
1540542 3/1977 United Kingdom .

OTHER PUBLICATIONS

Nissan Service Weekly No. 429, p. 175.

*Primary Examiner*—Robert R. Song
*Attorney, Agent, or Firm*—Leydig, Voit & Mayer

[57] ABSTRACT

A body of a vehicle such as an automobile has a rear parcel shelf which is constituted by left and right shelf members joined, respectively, to left and right rear pillars, and a center shelf member extending between the left and right shelf members. The center shelf member has a generally horizontal center shelf panel, and a rear waist panel having front and rear flanges and a channel portion extending laterally of the vehicle between the front and rear flanges and bulging upwardly. The front and rear flanges of the rear waist panel are joined to the upper surface of the center shelf panel to form a box beam. Each of the left and right shelf members has a reinforce panel and a side shelf panel which are joined to the bottom surface of the rear waist panel to form a continuous extension of the box beam.

14 Claims, 9 Drawing Figures

VEHICLE BODY HAVING REAR PARCEL SHELF

BACKGROUND OF THE INVENTION

The present invention relates to a vehicle body such as an automobile body, and more specifically to a rear parcel shelf of a vehicle body.

One conventional construction of a rear end of a passenger compartment of a vehicle body is shown in Nissan Service Weekly No. 429, p175. In this example, as shown in FIG. 9, a rear waist panel which extends in a lateral direction of the vehicle body and supports a bottom edge of a rear window glass, a rear parcel shelf panel and a reinforcing panel are joined together to form a box beam whose inner space is in fluid communication with the outside of the vehicle body through one or more ducts. That is, the box beam is formed by three panels. Therefore, this construction is disadvantageous in that the number of component parts and the number of joints requiring spot welding are increased, and that the shape of the box beam is restricted by the shapes of the three panels, so that the sectional area of the box beam cannot be increased sufficiently without decreasing the rigidity of the box beam.

SUMMARY OF THE INVENTION

It is an object of the present invention to provide a vehicle body having a box beam which extends in a lateral direction of the vehicle body in a rear end of the passenger compartment and which is so designed that the number of component parts and the number of joints requiring spot welding can be reduced and that the sectional area of the box beam can be increased.

According to the present invention, a vehicle body comprises left and right rear pillar inner panels, left and right side rear parcel shelf members, respectively, joined to the left and right rear pillar inner panels, and a center rear parcel shelf member extending in a lateral direction of the vehicle body, joining the left and right side shelf members to form a rear end of a passenger compartment of the vehicle body, and comprising a generally horizontal center rear parcel shelf panel and a rear waist panel having front and rear flanges extending in the lateral direction and a channel portion extending in the lateral direction between the front and rear flanges and having a U-shaped cross section. The front and rear flanges are joined to the center shelf panel to form a box beam extending in the lateral direction.

Each of the left and right side members may comprise a reinforcing panel and a side rear shelf panel which are joined to the rear pillar inner panel of the same side of the vehicle body, and joined to the rear waist panel so that the reinforcing, side shelf and rear waist panels forms a continuous extension of the box beam.

DETAILED DESCRIPTION OF THE INVENTION

Figure 9:
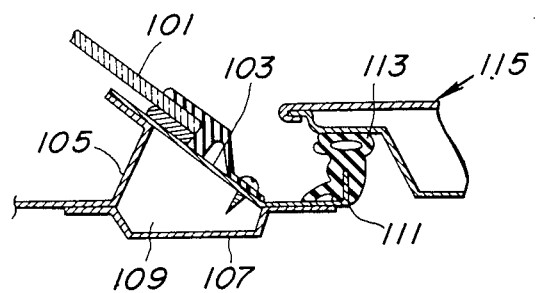
FIG. 9 is a sectional view similar to FIG. 3 but showing a conventional example.

FIG. 9 shows the conventional construction shown in Nissan Service Weekly No. 429, p175. As mentioned before, a box beam having an inner space 109 is formed by a rear waist panel 103 extending in a vehicle lateral direction and supporting a bottom end of a rear window glass 101, a rear parcel shelf panel 105 and a reinforcing rear waist panel 107. The inner space 109 of the box beam is in fluid communication with the outside of the vehicle body through one or more ducts (not shown). A weather strip 113 is attached to a rear flange 111 of the rear waist panel 103. A trunk lid 115 abuts on the weather strip 113 when the trunk lid 115 is in its closed position.

One embodiment of the present invention is shown in FIGS. 1-8. A vehicle body of this embodiment has left and right rear piller inner panel 25, left and right side rear parcel shelf members 3, and a center rear parcel shelf member 1, as shown in or evident from FIG. 1.

Figure 1:
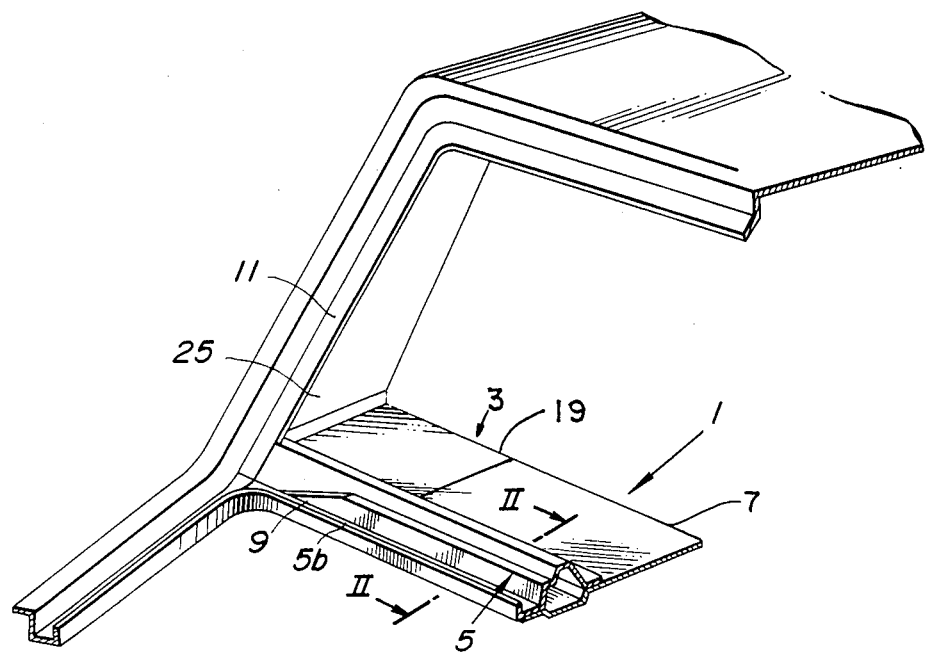
FIG. 1 is a perspective view of a left part of a rear end of a passenger compartment of a vehicle body according to the present invention.
Figure 2:
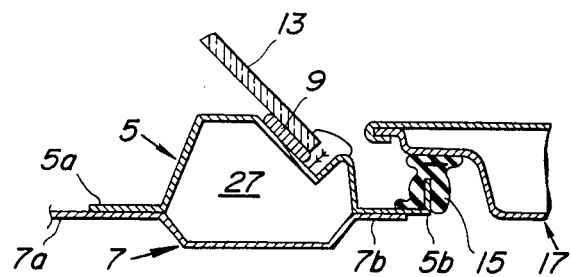
FIG. 2 is a sectional view taken along the line II—II of FIG. 1.
Figure 3:
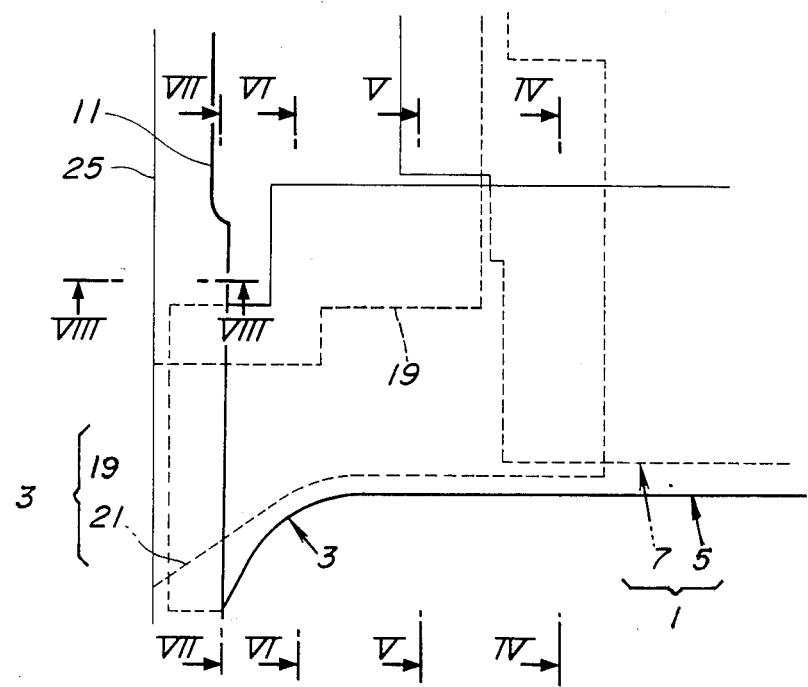
FIG. 3 is a plan view of a main portion of FIG. 1.
Figure 4:
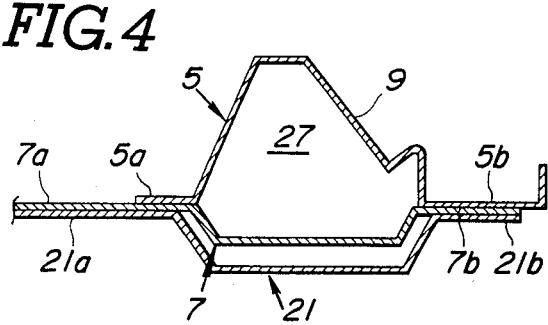
FIG. 4 is a sectional view taken along the line IV—IV of FIG. 3.

The center rear parcel shelf member 1 has a rear waist panel 5 and a center rear parcel shelf panel 7. As shown in FIG. 2, the rear waist panel 5 has front and rear flanges 5a and 5b which are generally horizontal and extend in a vehicle lateral direction, and a channel portion which extends in the vehicle lateral direction between the front and rear flanges 5a and 5b, and has a U-shaped cross sectional shape. The center shelf panel 7 has a front main portion 7a which is generally horizontal, a rear flange 7b, and a downwardly depressed groove portion lying between the front main portion 7a and the rear flange 7b. The front flange 5a of the rear waist panel 5 is joined to an upper surface of the front main portion 7a of the center shelf panel 7, and the rear flange 5b is joined to an upper surface of the rear flange 7b of the center shelf panel 7. Accordingly, the rear waist panel 5 and the center shelf panel 7 form a box or hollow beam or girder having a closed inner space 27 which extends in the vehicle lateral direction. The channel portion of the rear waist panel 5 bulges upwardly, and has a rear cant or inclination 9 sloping down from a top of the channel portion to the rear flange 5b. The rear cant 9 is formed with an outwardly raised step near the rear flange 5b. A bottom end of a rear window glass 13 is supported by the step of the rear cant 9 and fixed to the rear cant 9. A weather strip 15 is attached to the rear flange 5b. A trunk lid 17 abuts on the weather strip 15 when the trunk lid is closed. Each of left and right rear fender panels 28 (shown in FIG. 8) has a flange 11 (shown in FIG. 1) for holding the rear window glass 13.

Each of the side rear parcel shelf members 3 has a side rear parcel shelf panel 19 and a reinforcing panel 21 which are joined to the rear waist panel 5 and the center shelf panel 7 on the left or right side of the center shelf member 1. The reinforcing panel 21 and the side shelf panel 19 of each side member 3 are joined to the rear pillar inner panel 25. The rear waist panel 5 and the reinforcing panel 21 of each side member 3 form a continusou extension of the box beam having the inner space 27. Therefore, the inner space 27 extends continuously in the vehicle lateral direcition between the left and right rear pillar inner panels 25 over the left and right shelf members 3 and the center shelf member 1. The side shelf panel 19 of each side member has a front portion 19a and a rear end portion having a rear edge 19b. The reinforcing panel 21 of each side member 3 has a front portion 21a, a rear flange 21b and a downwardly depressed groove portion lying between the front portion 21a and rear end portion.

The construction of the box beam varies from place to place along the vehicle lateral direction as shown in the cross sections of FIGS. 2 and 4–7 although its inner space 27 of a box sectional shape extends continuously over the full length. In an central area, the box beam has the construction as shown in FIG. 2. Each of the left and right sides of the box beam is as follows: In an area at and near the section of FIG. 4 which is closest to the center longitudinal line of the vehicle body among the sections of FIGS. 4–7, the front flange 5a of the rear waist panel 5, the front portion 7a of the center shelf panel 7 and the front portion 21a of the reinforcing panel 21 are overlapped and joined together. The rear flanges 5b, 7b and 21b of the rear waist panel 5, center shelf panel 7 and reinforcing panel 21 are overlapped and joined together. The box beam is constructed in this way in this area. In an area at and near the section of FIG. 5 located next to the section of FIG. 4 on the outboard side, the rear flanges 5b and 21b of the rear waist panel 5 and reinforcing panel 21 are overlapped and joined together, and the front flange 5a of the rear waist panel 5, the front portions 19a and 21a of the side shelf panel 19 and reinforcing panel 21 are overlapped and joined together. The rear edge 19b of the side shelf panel 19 is located within the inner space 27 of the box beam and not joined to the rear waist panel 5. The front portion 7a of the center shelf panel 7 overlies the front portion 19a of the side shelf panel 19 in front of the front flange 5a of the rear waist panel 5.

Figure 5:
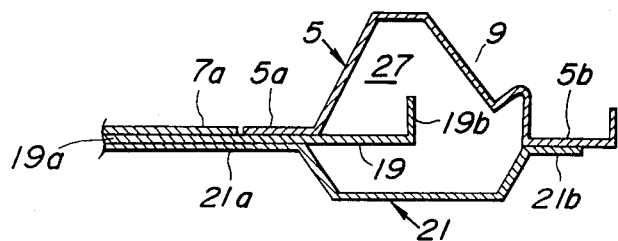
FIG. 5 is a sectional view taken along the line V—V of FIG. 3.
Figure 6:
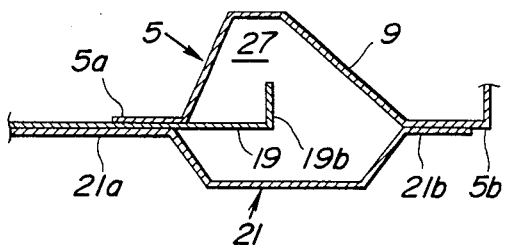
FIG. 6 is a sectional view taken along the line VI—VI of FIG. 3.
Figure 7:
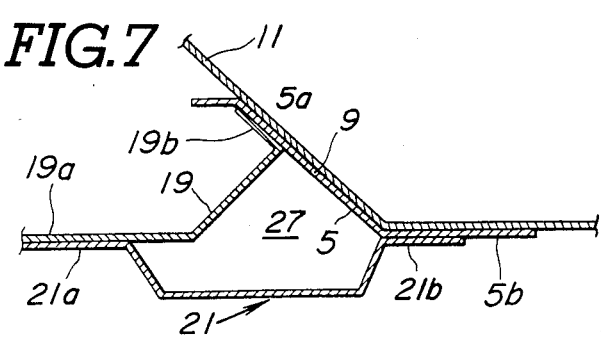
FIG. 7 is a sectional view taken along the line VII—VII of FIG. 3.

In an area at and near the section of FIG. 6 which is next to the section of FIG. 5 on the outboard side, the rear edge 19b of the side shelf panel 19 is not joined to the rear waist panel 5, but located within the inner space 27 formed by the rear waist panel 5 and reinforcing panel 21. In this area, the rear cant 9 of the rear waist panel 5 does not have the outwardly raised step. In the most outboard area at and near the section of FIG. 7, the rear edge 19b of the side shelf panel 19 is joined to the under surface of the rear waist panel 5, the rear flange 21b of the reinforcing panel 21 is joined to the under surface of the rear flange 5b of the rear waist panel 5, and the front portion 21a of the reinforcing panel 21 is joined to the under surface of the front portion 19a of the side shelf panel 19. In the most outboard area, the box beam is formed by these three joints. The flange 11 of the rear fender panel 28 overlies the rear waist panel 5.

Figure 8:
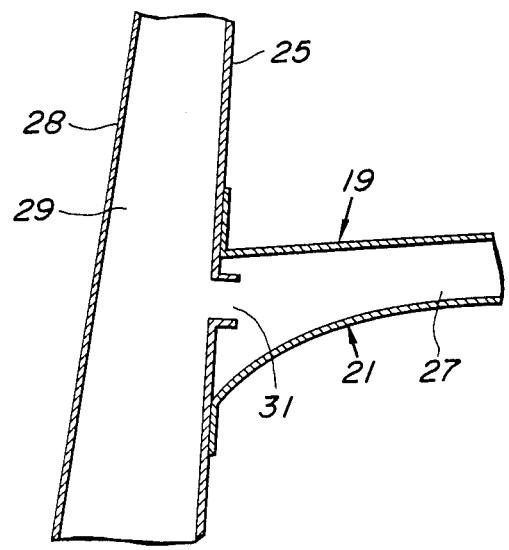
FIG. 8 is a sectional view taken along the line VIII—VIII of FIG. 3.

As shown in FIG. 8, the rear pillar inner panel 25 of each side forms a vertically extending closed inner space 29 with a rear fender panel 28. The rear pillar inner panel 25 is formed with an opening 31 through which the inner space 27 of the box beam is in fluid communication with the vertically extending inner space 29. In this embodiment, the inner space 27 of the box beam is in fluid communicatin with a passenger compartment of the vehicle body, and the vertically extending inner space 29 is in fluid communication with the outside of the vehicle body. Therefore, the air in the passenger compartment can flow to the outside through the inner space 27 of the box beam, the openings 31 of the left and right rear pillar inner panels 25 and the vertically extending inner spaces 29 on both sides. The sectional area of the inner space 27 of the box beam can be made large enough so that the air can flow therethrough efficiently.

According to the present invention, the sectional area of the box beam can be increased. Furthermore, the inner space 27 in the center shelf member 1 is formed only by the rear waist panel 5 and center shelf panel 7. Therefore, the number of component parts and the number of joint portions can be reduced while the rigidity of the box beam is maintained at a satisfactory level by virtue of the channel portion of the rear waist panel 5. Consequently, the construction of the present invention can reduce the manufacturing cost, improve the efficiency of assembly operation and contribute to weight reduction.

What is claimed is:
1. A rear portion of a vehicle body comprising:
left and right pillar inner panels,
left and right side parcel shelf members, respectvely, joined to said left and right pillar inner panels, and
a center parcel shelf member extending in a lateral direction of the vehicle body, joining said left and right side shelf members to form a rear end of a passenger compartment of the vehicle body, and comprising a center parcel shelf panel having a generally horizontal front portion serving as a rear panel shelf and a rear portion; and a waist panel lying on said center shelf panel and having front and rear flanges extending in the lateral direction and a channel portion extending in the lateral direction between said front and rear flanges and projecting upwardly so that the cross section of said channel portion has an inverted U-shape, said front and rear flanges of said waist panel being joined to an upper surface of said rear portion of said center shelf panel to form a box beam extending between said front and rear flanges in the lateral direction.

2. A rear portion of a vehicle body according to claim 1 wherein each of said left and right side parcel shelf members comprises a reinforcing panel and a side shelf panel joining the center shelf panel and corresponding pillar inner panel so that said reinforcing panel, said side shelf panel, and said waist panel form a continuous extension of the box beam.

3. A rear portion of a vehicle body according to claim 2 further comprising left and right fender panels joining, respectively, with said left and right pillar inner panels to form left and right closed vertical inner spaces extending generally vertically, and wherein a horizontal inner space of the extended box beam formed by each of said left and right side parcel shelf members is in fluid communication with the vertical inner spaces formed by said fender panels and said pillar inner panels.

4. A rear portion of a vehicle body according to claim 3 wherein each of said left and right pillar inner panels is formed with an opening for providing fluid communication between the horizontal inner space of the extended box beam and the corresponding vertical inner space.

5. A rear portion of a vehicle body according to claim 2 wherein said side shelf panel of said side parcel shelf members overlaps said corresponding reinforcing panel, and both of said side shelf and reinforcing panels are joined to a lower surface of said waist panel.

6. A rear portion of a vehicle body according to claim 2 wherein said waist panel extends substantially over the full length between said pillar inner panels in the lateral direction of the vehicle body, and said center shelf panel is shorter in the lateral direction of the vehicle body than said waist panel, so that both sides of said waist panel project from said center shelf panel.

7. A rear portion of a vehicle body according to claim 6 wherein said U-shaped channel portion of said waist panel is joined to said center shelf panel near a rear end of said center shelf panel, and said center shelf panel of said center parcel shelf member is downwardly depressed to form a groove between said flanges and engages with said upwardly projecting U-shaped channel portion of said waist panel to form said box beam extending in the lateral diretion between said flanges.

8. A rear portion of a vehicle body according to claim 7 wherein said U-shaped channel portion of said waist panel includes a front cant, a top cant and a rear cant which define the U-shaped cross sectional shape of said channel portion, said rear cant being formed with an outwardly raised step extending in the lateral direction near said rear flange and adapted to receive a lower edge of a rear window glass.

9. A rear portion of a vehicle body according to claim 8 wherein said reinforcing panel of each side parcel shelf member has a generally horizontal front flange, a horizontal coplanar rear flange and a groove portion downwardly depressed to form a groove extending in the lateral direction therebetween.

10. A rear portion of a vehicle body according claim 9 wherein said side shelf panel of each side parcel shelf member has a generally horizontal front portion, an upwardly bent rear end portion extending in the lateral direction of the vehicle body over, an entire length of said side parcel shelf member said front portion being clamped and joined between said front flange of said waist panel and said front flange of said reinforcing panel, said upwardly bent rear end portion lying within the inner space of the box beam in a spaced relationship with said waist panel in an area close to said center parcel shelf member, said upwardly bent rear end portion being joined to the lower surface of said waist panel in an area between said pillar inner panels and said center parcel shelf member.

11. A rear portion of a vehicle body according to claim 10 wherein said center shelf panel of said center parcel shelf member includes left and right side parts and a central part lying therebetween and projecting beyond said left and right side parts toward the rear of the vehicle body, said central part having a front flange, a U-shaped groove portion and a rear flange while each of said left and right side parts having only a front flange, said reinforcing panel of each side parcel shelf member underlying said central part of said center shelf panel, said side shelf panel of each side parcel shelf member overlapping only said side parts of said center shelf panel without overlapping said central part.

12. A rear portion of a vehicle body according to claim 11 wherein said front flange of said reinforcing panel is joined to the lower surface of said front flange of said waist panel with the interposition of said front flange of said central part of said center shelf panel and said rear flange of said reinforcing panel is joined to the lower surface of said rear flange of said waist panel with the interposition of said rear flange of said central part of said center shelf panel, said front flange and rear flange of said reinforcing panel being joined, respectively, to said side shelf panel and said rear flange of said waist panel.

13. A rear portion of a vehicle body according to claim 12 wherein said upwardly bent rear end portion of each side shelf panel is joined to the lower surface of said rear cant of said waist panel in an area close to said pillar inner panels.

14. A rear portion of a vehicle body according to claim 13 wherein said groove portion of each reinforcing panel is located under and spaced from said groove portion of said center shelf panel.

* * * * *